July 4, 1972  KIYOSHI IHA  3,674,347
FILM CARTRIDGE SUPPORT ASSEMBLY FOR PROJECTORS
Filed June 25, 1970  2 Sheets-Sheet 1
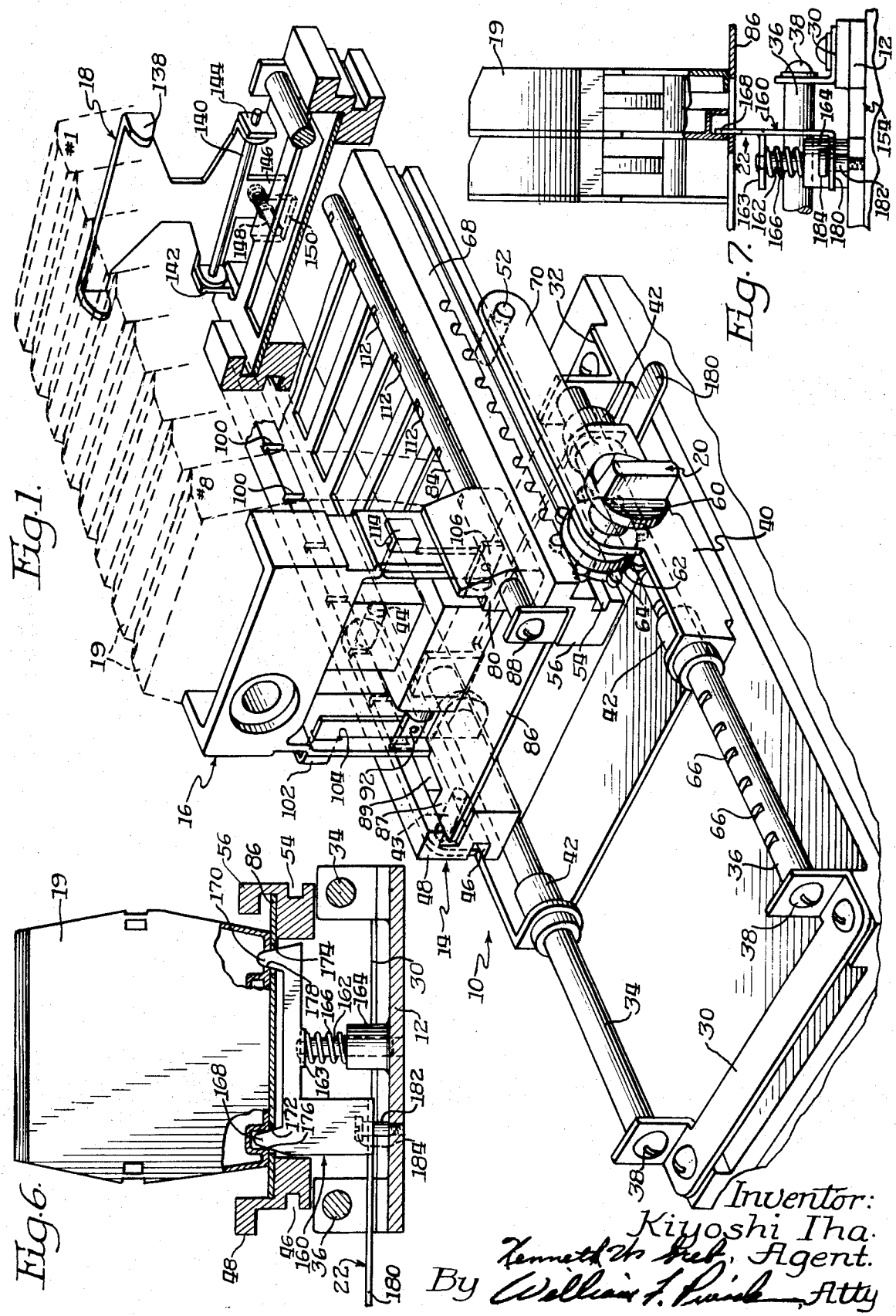

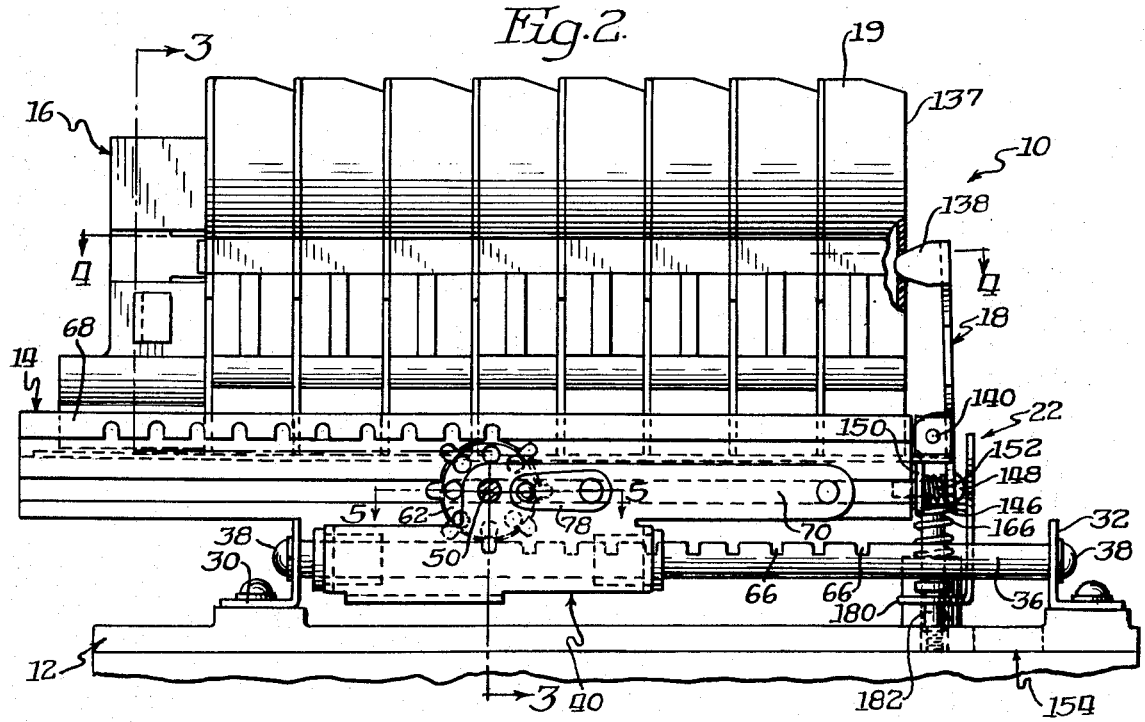
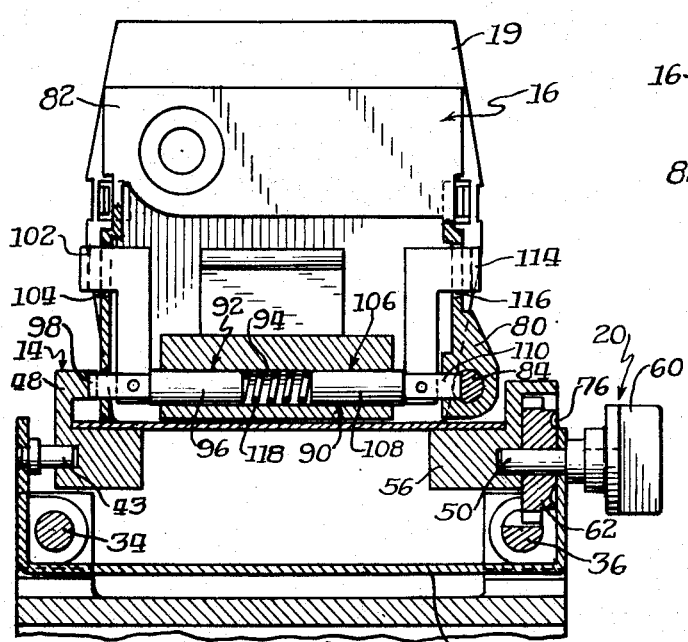
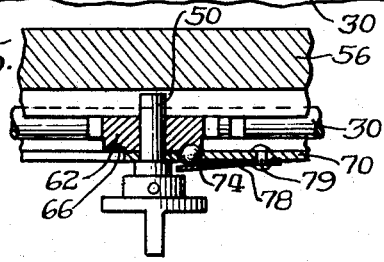

United States Patent Office 3,674,347
Patented July 4, 1972

3,674,347
FILM CARTRIDGE SUPPORT ASSEMBLY FOR PROJECTORS
Kiyoshi Iha, Elk Grove Village, Ill., assignor to Bell & Howell Company, Chicago, Ill.
Filed June 25, 1970, Ser. No. 49,799
Int. Cl. G03b 21/04
U.S. Cl. 352—73         10 Claims

ABSTRACT OF THE DISCLOSURE

A support assembly operable for supporting any one of a plurality of film supply cartridges at a projection station on a motion picture projector. The assembly includes a tray for positioning one of the cartridges at the projection station and includes an aligning member supported on the projector independently of the tray for movement from a retracted position to a cartridge engaging position for aligning a cartridge at the projection station.

---

The present invention relates to a motion picture projector and more particularly to a support assembly for positioning any one of a plurality of interlocked film supply cartridges at a projection station and for aligning the selected cartridge at the projection station.

Known motion picture projectors use a fixed capacity magazine for supporting one or more reels of film on the projector. These projectors also use an indexing mechanism for positioning and aligning the magazine to locate a selected one of the reels of film at the projection station. Although the magazine system fulfils its purpose, it has a disadvantage when it is desirable to project a specific sequence of reels of film less than the capacity of the magazine. Under this condition, the unused space in the magazine not only requires special attention of the operator to avoid such spaces during projection but also results in wasted storage space.

It is an object of the present invention to provide a support assembly for a motion picture projector capable of securely attaching one or a plurality of interlocked film supply cartridges to the projector, thereby avoiding the use of a fixed capacity magazine.

It is another object of this invention to provide a support assembly capable of positioning any one of a plurality of film supply cartridges at a projection station.

Experience has demonstrated that a relatively precise alignment of a selected one of a plurality of stacked film supply cartridges at the projection station is necessary for efficient and reliable withdrawal of the film from the cartridge and for efficient projection of the film. Therefore, it is a further object of the present invention to provide a support assembly including alignment means operable for engaging and aligning the film supply cartridge at the projection station.

These and other objects of the invention will be readily understood by those skilled in the art with reference to the following specification and accompanying figures.

In the drawings:

FIG. 1 is a perspective view of the present invention showing a plurality of interlocked film supply cartridges attached to the support assembly and showing the support assembly in an extended position.

FIG. 2 is a right side elevational view showing the support assembly in a non-extending position.

FIG. 3 is a partial sectional end view taken along lines 3—3 of FIG. 1.

FIG. 4 is an enlarged partial sectional plan view taken along line 4—4 of FIG. 2 with a single cartridge assembled to the projector.

FIG. 5 is an enlarged partial sectional view taken along line 5—5 of FIG. 2.

FIG. 6 is an end view showing the alignment means in the effective position.

FIG. 7 is a side view of FIG. 6.

Referring to FIG. 1, a support means 10 is rigidly assembled to the projector 12. A tray 14 is movably mounted on the support means 10. An adjustable end support 16 cooperates with a spring biased end support 18 for attaching one or a plurality of interlocked film supply cartridges 19 to the tray 14. An indexing means 20 is operable to index the tray 14 is relative to the support means 10 for positioning any one of a plurality of cartridges 19 at the projection station. An aligning means 22, shown in FIG. 6, is supported on the projector 12 and is operable from an effective alignment position for aligning any one of a plurality of cartridges 19 at the projection station to an ineffective retracted position for selectively positioning a cartridge 19 at the projection station.

The support means 10 includes a pair of brackets 30 and 32 rigidly assembled to the projector 12 by any suitable means. A pair of shafts 34 and 36 are rigidly assembled to the brackets 30 and 32 by screws 38 shown in bracket 30 with like screws in bracket 32. A sub-carriage 40 is slidably supported on shafts 34 and 36 by a set of bushings 42, each one being rigidly assembled to the sub-carriage 40 and being slidable relative to the shafts 34 and 36.

The tray 14 is slidably supported on the sub-carriage 40 by a pair of guide pins 43 and 44 rigidly extending from one side of the sub-carriage 40 and into a groove 46 extending along a guide rail 48. A second pair of pins 50 and 52 rigidly extend from the sub-carriage 40 and into a groove 54 extending along a second guide rail 56.

The indexing means 20, shown in FIGS. 1 and 3, includes a knob 60 and a gear 62 rigidly assembled to the pin 50. The gear 62 has teeth 64 simultaneously engaging notches 66 in the shaft 36 as well as a toothed rack 68 integrally extending along the guide rail 56. Turning the knob 60 advances the gear 62 along the shaft 36 which, in turn, moves the sub-carriage 40 relative to the shaft 36 a distance directly proportional to the rotation of the knob 60. Since the toothed rack 68 directly engages the gear 62, the tray 14 is moved relative to the shaft 36 twice the distance of the sub-carriage 40 movement. The pin 52 is supported on an arm 70 integrally extending from the sub-carriage 40 in a direction parallel to the movement of the tray 14. The pin 44 supported on an arm 72 integrally extending from the sub-carriage 40 in a direction parallel to the arm 70. The movement of the sub-carriage 40 relative to the shaft 36 and the movement of the tray 14 relative to the sub-carriage 40 causes a telescopic movement whereby arms 70 and 72 of the sub-carriage 40 are extended under the tray 14 to support the tray 14 as it moves away from the supporting shaft 34 and 36. The position of the tray 14 shown in FIG. 1 locates the end cartridge #8 at the projection station for projecting the film carried therein.

The indexing means 20 has a detent arrangement, FIGS. 2 and 5, for detenting the tray 14 in a position for projection of any one of the cartridges carried thereon. The detent arrangement includes a ball 74 seated in any one of several recesses 76 in the gear 62 and a leaf spring 78 which urges the ball 74 into one of the recesses 76. The leaf spring 78 is rigidly assembled to the arm 70 of sub-carriage 40 by any suitable means such as stud 79.

The tray 14 can be moved in either direction by indexing means 20 to position any one of the eight cartridges 19 at the projection station.

The end support 16 is adjustably supported on the tray 14 for movement in a direction parallel to the guide rails 48 and 56. A slide 80 is rigidly assembled to one lower corner of a main body 82 of end support 16 by any suitable means. A shaft 84 extends through the slide 80 and is rigidly assembled to a plate 86 by screws 88, one of which is shown. The opposite lower corner of the main body 82 is guided in a groove 87 in the guide rail 48 by a slide 89 attached to the main body 82.

Now referring to FIG. 3, a detent means 90 is carried by the end support 16 and is manually operable to hold the end support 16 in any one of several selected positions along the tray 14. A detent member 92 is slidably supported in a horizontal cylindrical opening 94 in the main body 82 at one lower corner. The detent member 92 has a cylindrical end 96 supported in the opening 94 and has a detent end 98 for engaging any one of several notches 100 in the rail guide 48. A lever 102 is rigidly connected at one end to the detent member 92. The other end of lever 102 extends through a guide slot 104 in the main body 82. A second detent member 106 has a cylindrical end 108 supported in the opening 94 and has a detent end 110 for engaging any one of several notches 112 in the shaft 84. A second lever 114 is rigidly connected at one end to the detent member 106. The other end of lever 114 extends through a guide slot 116 in the main body 82. A compression spring 118 is placed in the opening 94 for urging each of the detent members 92 and 106 into engagement with respective notches 100 and 112 thereby detenting the end support 16 in any one of several selective positions along the tray 14.

To release the detent means 90 for adjusting the end support 16 relative to the tray 14, the levers 102 and 114 are pressed toward each other against the tension of spring 118 until each detent end 98 and 110 are withdrawn from the respective notches 100 and 112. The end support 16 is adjusted to hold a stack of eight cartridges 19 as shown in FIG. 1 and is adjusted to hold one cartridge 19 as shown in FIG. 4.

Referring to FIG. 4, a cartridge 19 can be releasably attached to the end support 16. The main body 82 of the end support 16 has a pair of flexible anchor tabs 120 and 122 integrally extending from opposite ends walls 124 and 126. Each cartridge 19 has a pair of flexible mounting tabs 128 and 130 extending from opposite sides. To attach one cartridge 19 or a stack of interlocked cartridges 19 to the end support 16, the mounting tabs 128 and 130 of one cartridge 19 are pressed against anchor tabs 120 and 122 causing the tabs to flexably interlock as shown in FIG. 4. One or more cartridges 19 being attached to the end support 16 can be moved horizontally relative to the tray 14 until a pair of openings 132 and 134 in the front face 137 of a cartridge 19 seat on a corresponding pair of fingers 136 and 138 extending horizontally from the spring biased end support 18.

Referring to FIGS. 2 and 4, the end support 18 is pivotally mounted on a shaft 140 which is supported on a pair of ears 142 and 144 formed from the plate 86. A lower extension 146 of end support 18 supports a pin 148 which extends through a guide ear 150 formed from plate 86. A spring 152 is placed around the pin 148 and between ear 150 and extension 146 for biasing fingers 136 and 138 into cartridge openings 132 and 134. It can now be seen that the adjustable end support 16 cooperates with the spring biased end support 18 for attaching one or a stack of interlocked cartridges 19 to the tray 14. If found to be desirable, the cartridge and/or the projector can be modified for attaching one or more cartridges to the projector.

To remove a cartridge 19 from the projector, levers 102 and 114 are pressed toward each other to free the end support 16 from the tray 14. The end support 16 is moved away from end support 18 which moves the front cartridge away from end support 18. The stack of cartridges 19 may be released from end support 16 by pulling tabs 128 and 130 over anchor tabs 120 and 122 until the tabs yield relative to each other for releasing from each other.

The alignment means 22, FIGS. 6 and 7, is mounted on the projector 12 and located at the projection station 154. The alignment means 22 is operable to retract from an effective position where the cartridge 19 is relatively precisely aligned at the projection station 154 to an ineffective position where the tray 14 is free to move the cartridges relative to the alignment means 22. An alignment member 160 is rigidly assembled to an upper-end of a post 162 at a formed ear 163. The lower end of the post 162 is supported in an apertured bushing 164 for axial displacement therein. The bushing 164 is rigidly assembled to the projector 12. A compression spring 166 is placed around the post 162 and is located between the ear 163 and the bushing 164 for biasing the alignment member 160 in an upward direction. The alignment member 160 has a pair of upwardly projecting aligning fingers 168 and 170. The plate 86 has a pair of openings 172 and 174 spaced to receive fingers 168 and 170. The cartridge 19 also has a pair of alignment openings 176 and 178 spaced to receive fingers 168 and 170. A lever 180 is integrally formed from alignment member 160 and extends out from the projector 12 for manual operation by the operator. A guide screw 182 extends through an opening in lever 180 and threads into the projector 12. The screw 182 acts as a guide to cooperate with post 162 to permit vertical movement of the alignment member 160 in a common plane. The screw 182 has the head 184 adjustable vertically to provide an upward limit of the alignment member 160 when there is no cartridge 19 located at the projection station.

Depressing lever 180 causes the entire alignment member 160 to move downwardly in a parallel path due to the guidance of post 162 and screw 182. This downward movement retracts fingers 168 and 170 from the openings 176 and 178 in the cartridge 19 and from openings 172 and 174 in the plate 86. The tray 14 is now free to move relative to the projection station 154 and the alignment means 22. When the operator releases lever 180, the alignment member 160 moves upward by the tension of spring 166 to position fingers 168 and 170 through the plate 86 and firmly into the openings 176 and 178 in any cartridge 19 to precisely align the cartridge 19 at the projection station.

What is claimed is:

1. A support assembly operable for supporting any one of a plurality of film supply cartridges at a projection station on a motion picture projector comprising:
   support means rigidly mounted on the projector;
   a tray forming an integral and non-detachable portion of said support assembly and movably mounted on said support means, said tray adapted for carrying a plurality of cartridges;
   attaching means mounted on said tray for holding a plurality of cartridges on said tray; and
   aligning means for engaging the cartridge at the projection station.

2. A support assembly as defined in claim 1, wherein said aligning means includes a member supported on the projector independently of said tray for movement from a retracted position to a cartridge engaging position and spring means for biasing said member into said cartridge engaging position.

3. A support assembly as defined in claim 1, wherein the plurality of cartridges includes means for interlocking one cartridge to another and said attaching means includes means engaging and locking each end cartridge to said tray thereby holding the plurality of cartridges on said tray.

4. A support assembly as defined in claim 1, wherein the plurality of cartridges includes means for interlocking one cartridge to another and said attaching means includes a first end support for engaging one end cartridge and a second end support for engaging the opposite end cartridge, said first end support and said second end support cooperating to hold the plurality of cartridges on said tray.

5. A support assembly as defined in claim 4, wherein said first end support is adjustable relative to said tray and cooperates with said second end support to hold a varying number of cartridges on said tray.

6. A support assembly as defined in claim 4, further comprising detent means for holding said first end support in any one of a plurality of positions along said tray.

7. A support assembly as defined in claim 4, further comprising spring means for biasing said second end support into engagement with said opposite end cartridge.

8. A support assembly as defined in claim 1, further comprising indexing means for moving said tray relative to said support means for positioning any one of the plurality of cartridges at the projection station.

9. A support assembly operable for supporting any one of a plurality of film supply cartridges at a projection station on a motion picture projector comprising:
  support means rigidly mounted on the projector;
  a sub-carriage mounted on said support means for movement relative thereto;
  a tray mounted on said sub-carriage for movement relative thereto and adapted for carrying a plurality of cartridges; and
  indexing means for positioning any one of said plurality of cartridges at the projection station; said indexing means including means for moving said sub-carriage relative to said support means and said tray relative to said sub-carriage in a telescoping relationship.

10. The support assembly as defined in claim 9 wherein said means for moving said sub-carriage relative to said support means and said tray relative to said sub-carriage comprises a member rotatably mounted on said sub-carriage and in driving engagement with said tray whereby rotation of said member is effective to move said sub-carriage a predetermined distance relative to said support means and to simultaneously move said tray a predetermined greater distance relative to said support means.

References Cited
UNITED STATES PATENTS

| | | | |
|---|---|---|---|
| 3,550,879 | 12/1970 | Bundschuh et al. | 352—123 X |
| 3,472,579 | 10/1969 | Schwartz | 352—123 |
| 3,480,354 | 11/1969 | Fukuda | 352—123 |
| 3,508,818 | 4/1970 | Fried et al. | 352—123 |

LOUIS R. PRINCE, Primary Examiner

J. W. ROSKOS, Assistant Examiner

U.S. Cl. X.R.

352—123